United States Patent
Djelassi et al.

(10) Patent No.: US 10,381,823 B2
(45) Date of Patent: Aug. 13, 2019

(54) DEVICE WITH POWER SWITCH

(71) Applicant: Infineon Technologies AG, Neubiberg (DE)

(72) Inventors: Christian Djelassi, Villach (AT); Alexander Mayer, Treffen (AT)

(73) Assignee: Infineon Technologies AG, Neubiberg (DE)

( * ) Notice: Subject to any disclaimer, the term of this patent is extended or adjusted under 35 U.S.C. 154(b) by 469 days.

(21) Appl. No.: 15/160,883

(22) Filed: May 20, 2016

(65) Prior Publication Data

US 2017/0338646 A1 Nov. 23, 2017

(51) Int. Cl.
| | |
|---|---|
| H02H 5/00 | (2006.01) |
| H02H 5/04 | (2006.01) |
| H02H 1/00 | (2006.01) |
| H02H 3/04 | (2006.01) |
| H02H 3/08 | (2006.01) |
| H02H 3/44 | (2006.01) |

(52) U.S. Cl.
CPC .......... *H02H 5/041* (2013.01); *H02H 1/0007* (2013.01); *H02H 3/04* (2013.01); *H02H 5/044* (2013.01); *H02H 3/08* (2013.01); *H02H 3/445* (2013.01)

(58) Field of Classification Search
None
See application file for complete search history.

(56) References Cited

U.S. PATENT DOCUMENTS

| | | | | |
|---|---|---|---|---|
| 5,272,386 A | * | 12/1993 | Kephart | H02J 9/002 307/10.1 |
| 6,985,343 B2 | * | 1/2006 | Mirowski | G06F 1/28 361/93.2 |
| 8,923,022 B2 | * | 12/2014 | Zoels | H01L 27/0248 327/378 |
| 9,960,588 B2 | * | 5/2018 | Kreuter | H02H 1/0007 |
| 2015/0280425 A1 | | 10/2015 | Kreuter et al. | |
| 2016/0028307 A1 | | 1/2016 | Illing et al. | |

* cited by examiner

*Primary Examiner* — Stephen W Jackson
(74) *Attorney, Agent, or Firm* — Shumaker & Sieffert, P.A.

(57) ABSTRACT

A device comprises a solid-state power switch and a control configured to operate the power switch if at least one of a plurality of fault conditions of the device is triggered. An interface is configured to output a signal having a value selectively indicative of the triggered at least one fault condition in response to the at least one fault condition being triggered.

20 Claims, 11 Drawing Sheets

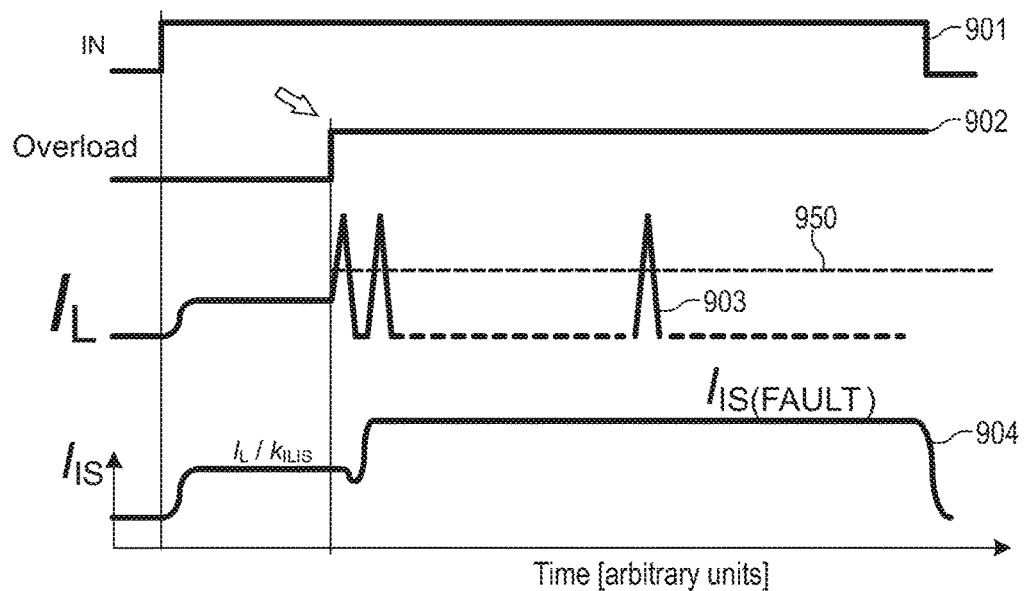

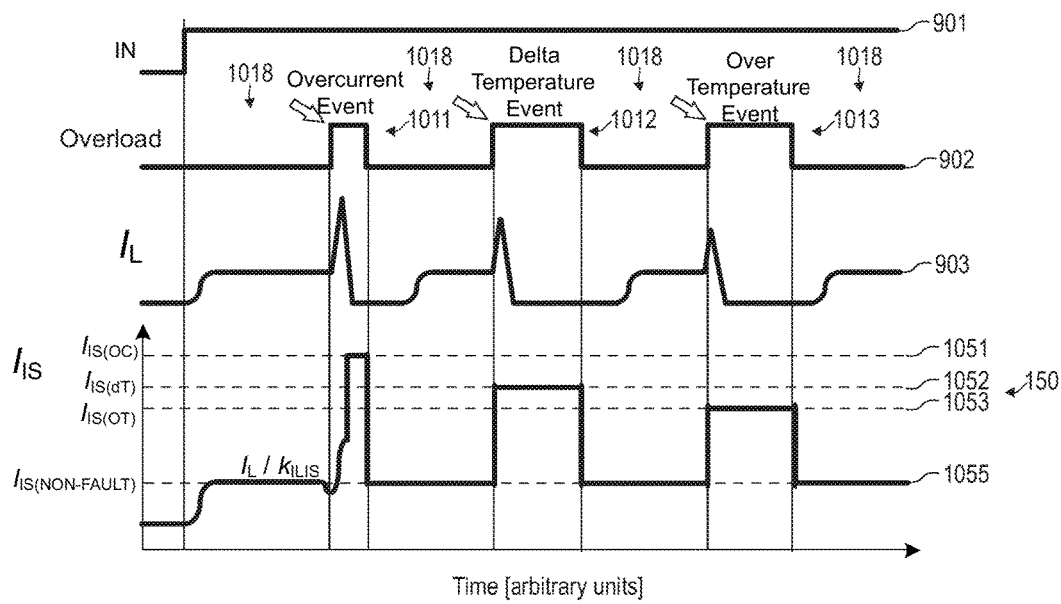

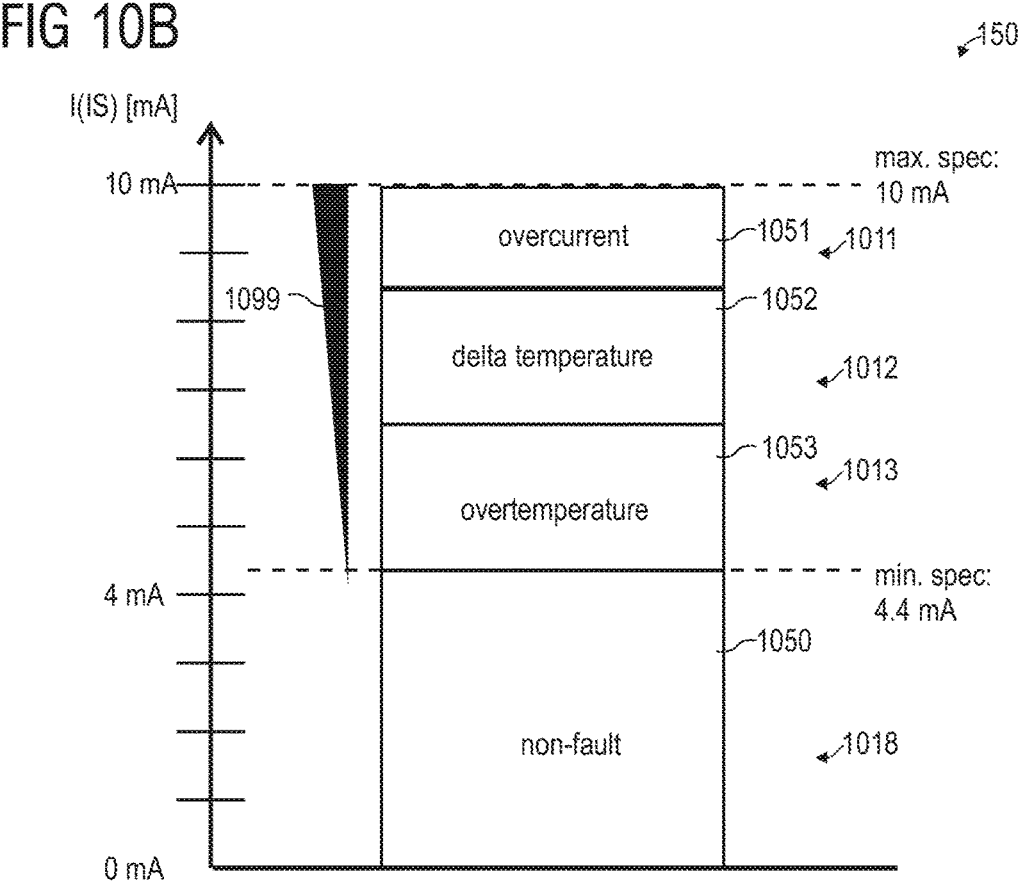

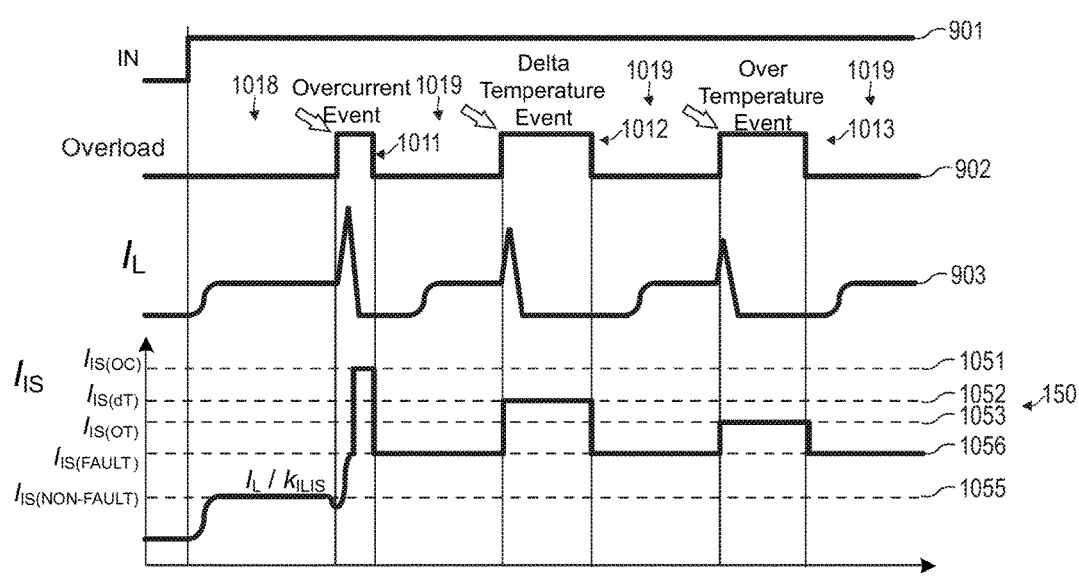

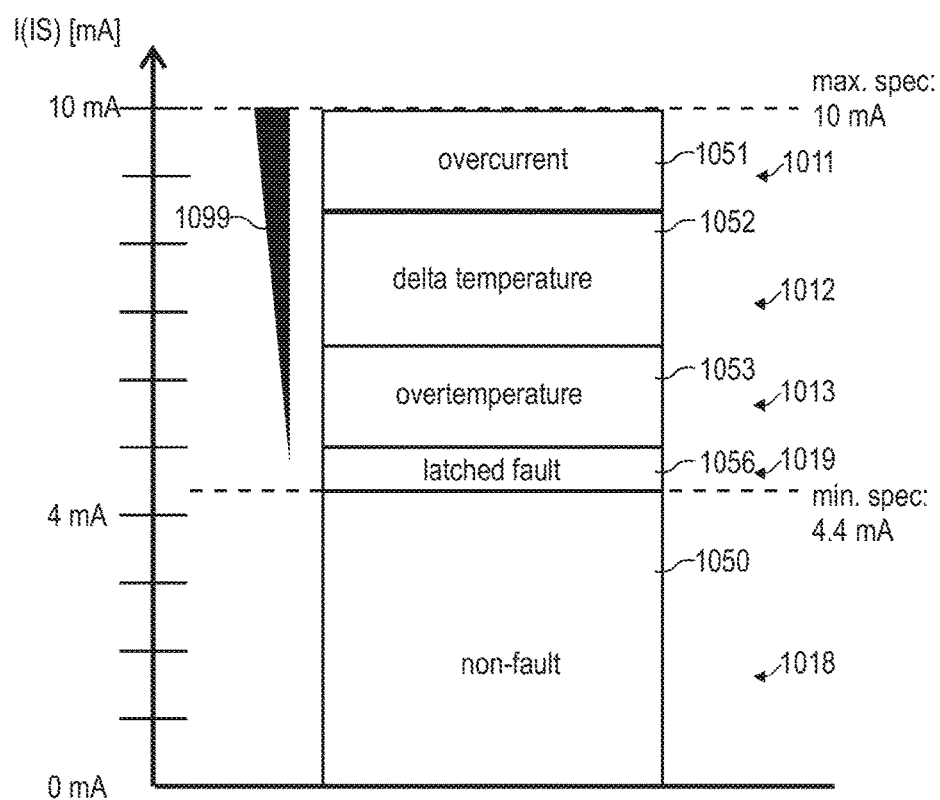

DEVICE WITH POWER SWITCH

BACKGROUND

Power switches are conventionally used to couple a load with a supply voltage. In recent years, "smart" power switch devices have been developed which are equipped with one or more diagnostic abilities and protection features, for example against fault conditions such as overload and short circuit events. For example, in such power switch devices a metal-oxide-semiconductor (MOS) transistor may be used as a power switch, and the switch may be operated in a defined state, e.g., caused to be non-conducting between terminals of the switch, in case of a fault condition.

In some examples, it is possible that the switch is reset after the fault condition has resolved. Nonetheless, it may be desirable to debug and analyze the fault condition. In reference implementations, this may not be possible or only possible to a limited degree.

BRIEF SUMMARY OF THE INVENTION

A need exists for advanced devices comprising a power switch which overcome or mitigate at least some of the above-identified drawbacks.

A device comprises a solid-state power switch and a control. The control is configured to operate the power switch if at least one of a plurality of fault conditions of the device is triggered. The device further comprises an interface. The interface is configured to output a signal having a value selectively indicative of the triggered at least one fault condition in response to the at least one fault condition being triggered.

A method comprises operating a solid-state power switch of a device if at least one of the plurality of fault conditions of the device is triggered. The method further comprises, in response to the at least one fault condition being triggered: outputting a signal having a value selectively indicative of the triggered at least one fault condition.

A method comprises applying a current pulse through a solid-state power switch of a device. The method further comprises, in response to said applying of the current pulse: monitoring a signal output by the device and having a value selectively indicative of a spatial-gradient of an ambient temperature of the power switch exceeding an associated threshold. The method further comprises, based on said monitoring: determining a cool-off time of the power switch.

The embodiments and aspects described above and herein-after can be combined with each other.

BRIEF DESCRIPTION OF THE SEVERAL VIEWS OF THE DRAWING(S)

FIG. 9 is a diagram illustrating a time-dependency of a signal according to the prior art which has a value non-selectively indicative of one or more fault conditions of a device comprising a power switch.

FIG. 10A is a diagram illustrating a time-dependency of a signal according to various embodiments which has a value selectively indicative of a triggered at least one fault condition.

FIG. 10B is a diagram illustrating different values of the signal uniquely associated with different fault conditions for the scenario of FIG. 10A.

FIG. 11A is a diagram illustrating a time-dependency of a signal according to various embodiments which has a value selectively indicative of a triggered at least one fault condition.

FIG. 11B is a diagram illustrating different values of the signal uniquely associated with different fault conditions for the scenario of FIG. 11A.

DETAILED DESCRIPTION OF THE INVENTION

Figure 1A:
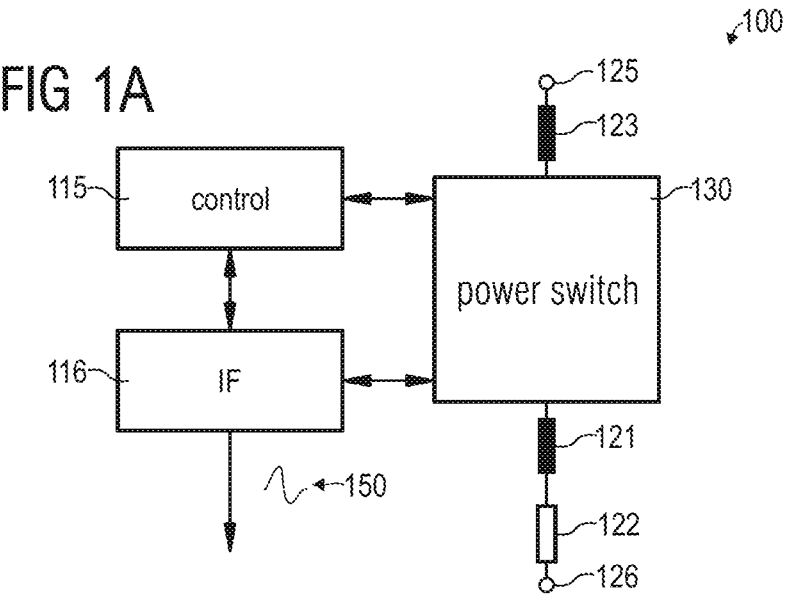
FIG. 1A is a schematic diagram of a device comprising a solid-state power switch, a control, and an interface according to various embodiments.

In the following, various embodiments will be described in detail with reference to the attached drawings. It is to be noted that these embodiments serve as illustrative examples only and are not to be construed as limiting the scope of the present application. For example, while an embodiment may be described as comprising a plurality of features or elements, this serves for illustration only, and in other embodiments some of these features or elements may be omitted and/or replaced by alternative features or elements. Furthermore, in some embodiments additional features or elements in addition to those described or shown in the drawings may be provided without departing from the scope of the present application. Also, features or elements from different embodiments may be combined with each other to form further embodiments.

Any connections or couplings, in particular electrical connections or couplings, shown in the drawings or described herein may be implemented as direct connections or couplings, i.e. as connections or couplings without intervening elements, or as indirect connections or couplings, i.e. connections or couplings with one or more intervening elements, as long as the general function of the connection or coupling, for example to transmit a certain kind of information, is essentially maintained. Connections or couplings may be implemented as wire-based connections or couplings or as wireless connections or couplings, or mixtures thereof.

Some examples relate to devices comprising a power switch having a shutdown or overload limit, in the following simply referred to as overload limit or threshold. When a given quantity, for example a voltage, a current and/or a temperature, reaches the overload limit, a fault condition of the device, or in particular the power switch is triggered.

When the fault condition is triggered, the power switch is operated. E.g., the power switch can be operated in an open position. When the power switch is opened, it becomes essentially non-conducting between terminals.

In some examples, a plurality of different fault conditions are available. E.g., some fault conditions may relate to temperature; while other fault conditions may relate to a current through the power switch. Then, by means of a respective signal, it may become possible to distinguish between the plurality of fault conditions. For this, the signal may have a value which is selectively indicative of the triggered at least one fault condition. Thus, from the value of the signal it may be learnt which one or more fault conditions have been triggered and which one or more fault conditions have not been triggered.

To achieve such a selective value for the signal, it is possible to select the value of the signal from a plurality of candidate values based on the triggered at least one fault conditions. E.g., the candidate values may be predefined and may be mapped in a well-defined way to the possible fault conditions. Each one of the plurality of candidate values may thus be uniquely associated with one of the plurality of fault conditions. In further examples, there may be some candidate values which are associated with more than one of the plurality of fault conditions; by such means, it is possible to selectively indicate a plurality of triggered fault conditions which are persistent at the same moment in time. Thereby, a superposition of co-triggered fault conditions may be resolved.

The pool of candidate values may be distinguished from at least one further value; the further value may thus be different from the plurality of candidate values and may be uniquely associated with a non-fault condition of the device. In a non-fault condition, the overload limits may not have been crossed. Thereby, it is possible to discriminate on a high level between a fault condition and a non-fault condition, e.g., without specifying the particular cause or reason for the fault condition.

Generally, a wide variety of different fault conditions can be employed in connection with the techniques described herein. The specific kind and type of the fault conditions used in combination with the techniques described herein may not germane for the functioning of the disclosed techniques. Examples of fault conditions relate to a current through the power switch exceeding an associate threshold. E.g., the current through the power switch may be a source-drain current, e.g., in case of an implementation of the power switch as a MOS device. It is also possible to consider a time-gradient of the current. E.g., it is possible to associate a further fault condition with the time-gradient of the current through the power switch exceeding an associated threshold. I.e., the time-gradient can be proportional to a time derivative or a magnitude of the time derivative of the time dependency of the current. The time-gradient can thus correspond to a rate of change of the current as a function of time. Thereby, fast changes in the source-drain current can be detected. A further class of fault conditions may relate to the ambient temperature, i.e., temperature in the surrounding of the power switch. E.g., it is possible that a further fault condition is defined as the ambient temperature of the power switch exceeding an associated threshold. Again, it is possible that also a time-gradient of the ambient temperature is considered as a further fault condition. It is also possible to consider a spatial-gradient of the ambient temperature exceeding an associated threshold as a further fault condition. The spatial-gradient may relate to a derivative of the spatial dependency of the temperature. The spatial-gradient can thus correspond to a rate of change of the temperature as a function of position. E.g., the spatial-gradient of the ambient temperature may be defined between two points in the surrounding of the power switch. The two points may be located in different directions of the power switch. Alternatively or additionally, the two points may be located at different distances from the power switch. E.g., a first point may be located on the same die on which the power switch is implemented; while a second point may be located on a chip carrier such as a printed circuit board (PCB) of the die. A still further class of fault conditions may relate to a voltage drop across the power switch. In an example, a fault condition is defined with respect to the voltage drop across the power switch exceeding an associated threshold. It would also be possible to consider time-gradient of the voltage drop across the power switch exceeding an associated threshold.

In the various examples, different kinds and types of signals can be implemented. E.g., the signal may be an analogue signal and may comprise a current flow or a voltage. Here, an amplitude of the current flow can be indicative of the triggered at least one fault condition; respectively, an amplitude of the voltage can be indicative of the triggered at least one fault condition. In addition or alternatively to such an analog implementation of the signal, it is also possible to implement a digital representation of the signal. Here, it is possible that the signal comprises a digital word, a number of the digital word being indicative of the triggered at least one fault condition.

Generally, in the context of the present application power switches may be described as comprising one or more control terminals and two or more load terminals. An opening and closing of the power switch (operating the power switch) may be controlled by applying one or more signals to the one or more control terminals. When the power switch is closed, it provides a low-ohmic connection between at least two of its load terminals, such that current may flow between the load terminals. When the switch is open, the power switch exhibits a blocking behavior between its load terminals, i.e. is high-ohmic, such that essentially no current may flow between the load terminals, e.g., with the exception of undesired effects like leakage current etc., which may occur in real devices.

In some embodiments, the power switch may be implemented using a field-effect transistor (FET) like a MOS transistor (MOSFET), an Insulated Gate Bipolar Transistor (IGBT), a Junction Field-Effect Transistor (JFET), a Bipolar Junction Transistor (BJT), a Gallium Nitride (GAN) Transistor, a Silicium Carbide (SiC) Transistor, or a High Electron Mobility Transistor (HEMI). In such a case, the load terminals may correspond to source and drain terminals of the field effect transistor, and the control terminal may correspond to a gate terminal of the field effect transistor.

The devices described herein comprising a power switch can be employed in a wide field of applications. E.g., modern automotive and industrial systems use smart power switches instead of fuses or electromechanical switches for low-voltage applications with medium to high current loads. Smart power switches are intelligent power switches equipped with several diagnostic abilities and protection features to identify different fault conditions. Thereby, overload and short circuit events can be prevented. Circuits like PN-junctions for temperature sensing, shunt resistors and operational amplifiers for current limitation/shutdown, as well as Zener diode clamping allow to protect against overvoltages. Due to cost and de-sign optimizations, smart power switches are typically stressed up to the thermal and electric limits.

Turning now to the figures, FIG. 1 shows a schematic block diagram of a power switch device 100 according to an embodiment. The power switch device 100 of FIG. 1 comprises a power switch 130. A first load terminal of power switch 130 is coupled with a first supply voltage 125, for example a positive supply voltage. An inductivity 123 represents an inductivity of the coupling, for example wiring, between power switch 130 and first supply voltage 125. A second load terminal of power switch 130 is coupled with a load 122, which in turn is coupled with a second supply voltage 126, for example ground or a negative supply voltage. An inductivity 121 represents an inductivity of a coupling between load 122 and power switch 130, for example an inductivity of a wiring.

A control terminal of power switch 130 is coupled to an overload control 115. Overload control 115 may be configured to open power switch 130 under certain fault conditions, for example when a overload limit is reached regarding for example a voltage drop over the power switch, a current flowing through the power switch, and/or a temperature of the power switch. Other criteria for shutdown, i.e., opening of the power switch, may be used alternatively or additionally. In some cases, as will be explained later in some more detail, opening the power switch may cause an energy stored in inductivities 123 and 121 or other inductivities coupled to power switch 130 to be "discharged", in particular clamped, via the power switch. For this clamping, as will be explained later a specific clamping circuitry like a Zener diode may be provided, or inherent properties of the power switch like an inherent reverse biased diode which may break through may be used.

The device 100 further comprises an interface 116. The interface 116 is configured to output a signal 150, e.g., an analog signal and/or a digital signal. The signal 150 can have different values over the course of time (time-dependency of the signal). By means of the different values of the signal 150, it is possible to indicate one or more fault conditions which have been triggered by the overload control 115. In particular, it becomes possible to discriminate between at least one fault condition which has been actually triggered by the overload control 115 and which has caused operation of the power switch 130, e.g., in an open position; and non-triggered fault conditions which have not been triggered by the overload control 115 and which have not caused operation of the power switch 130. Such a selective indication of the triggered at least one fault condition enables analysis and debug functionality. A more precise handling of the fault conditions becomes possible.

For this, the interface 116 may comprise one or more elements selected from the group consisting of: a microprocessor; an application-specific integrated circuit (ASIC); a current source; and a voltage source.

Figure 1B:
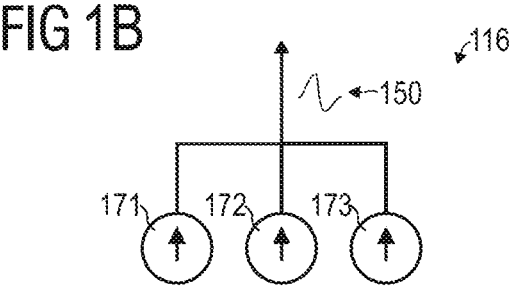
FIG. 1B is a schematic diagram of a plurality of current sources of the interface for generating a signal having a value selectively indicative of at least one triggered fault condition of the device of FIG. 1A.

FIG. 1B illustrates aspects with respect to the interface 116. In the example of FIG. 1B, the interface 116 comprises three current sources 171-173. It is possible that three current sources 171-173 are independently operated. The outputs of the three current sources 171-173 are combined; thereby, the signal 150 is provided as a superposition of the currents provided by each one of the current sources 171-173.

E.g., each one of the current sources 171-173 may be associated with a particular fault condition. E.g., the current source 171 may be associated with the fault condition where the current through the power switch exceeds an associated threshold; the current source 172 may be associated with a fault condition where the ambient temperature of the power switch exceeds an associated threshold; while the current source 173 may be associated with the fault condition where the spatial-gradient of the ambient temperature exceeds an associated threshold. If a given one of the fault conditions is triggered by the control 115, the respective current source 171-173 outputs a finite, non-zero current. If a given one of the fault conditions is not triggered by the control 115, the respective current source 171-173 outputs no current, i.e., current having amplitude zero. For this, the current sources 171-173 may be digitally controllable, e.g., by means of a digital control signal generated by the overload control 115.

FIG. 1B is an example. In other examples, a smaller or larger number of current sources may be provided. In further examples, the signal 150 may not correspond to a superposition of different amplitudes of currents associated with the different fault conditions.

Figure 2:
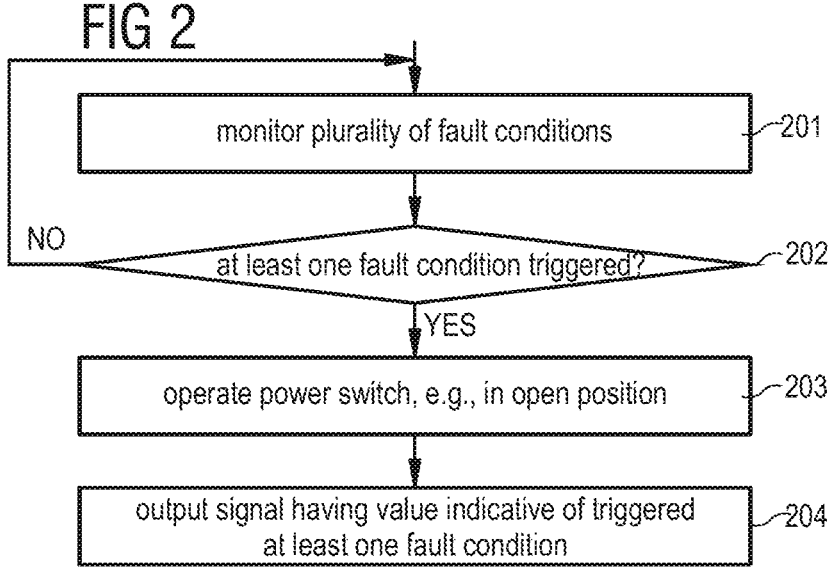
FIG. 2 is a flowchart of a method according to various embodiments.

FIG. 2 is a flowchart of a method according to various embodiments. At block 201, a plurality of fault conditions are monitored, e.g. by the control 115. This may comprise testing, e.g., at given reoccurring time samples, whether any one of the plurality of fault conditions has been triggered.

Next, at block 202, it is checked whether at least one fault condition is triggered. Block 202 may comprise executing a threshold comparison between a respective observable associated with each one of the fault conditions and an associated threshold overload limit. Depending on the threshold comparison, it may be judged whether the respective fault condition has been triggered.

If at least one fault condition has been triggered, block 203 is executed. At block 203, the power switch 130 is operated. In typical scenarios, 203 can comprise opening the power switch 130, i.e., interrupting a source-drain connection of a MOSFET implementation of the power switch 130.

Then, at 204 and in response to the triggering of the at least one fault condition, the signal 150 is output. The value of the signal 150 is selectively indicative of the triggered at least one fault condition. Thus, from the value of the signal 150 output at block 204 it can be learnt which one or more fault conditions have been the reason for operating the power switch at block 203.

Figure 3:
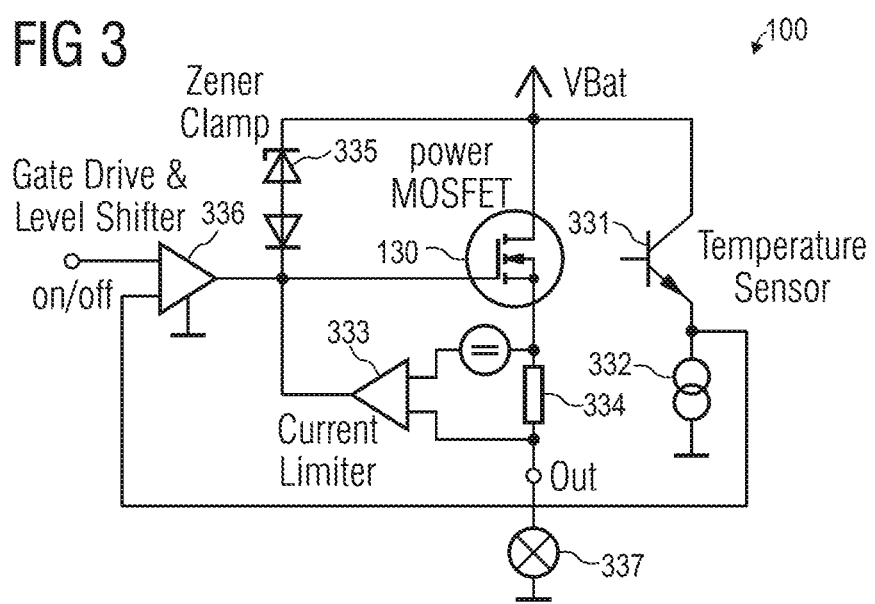
FIG. 3 is a diagram illustrating a device comprising a power switch which may form a basis for some embodiments.

In FIG. 3, a power switch device 100 comprising a power switch 130 and various circuitry associated with the power switch is shown. The power switch device 100 of FIG. 3 may form the basis of various embodiments. For example, the power switch device 100 of FIG. 3 may be combined with a control like control 115 of FIG. 1A in some implementations.

The power switch device 100 of FIG. 3 comprises a MOSFET 130 acting as a power switch to selectively couple a supply voltage, for example a battery voltage VBat, with a load, which load in case of FIG. 3 is represented by a light bulb 337. A gate terminal of power MOSFET 130 is coupled to an output of a gate driver and level shifter 336. Via gate driver and level shifter 336, using an on-off signal the switch may be selectively operated and thus turned on or off, an "on" state in the context of the present application corresponding to a closed state, and an "off" state corresponding to an open state.

Gate driver and level shifter 336 additionally receives a signal from a temperature sensor, which in the example of FIG. 3 is formed by a transistor 331 and a current source 332. Transistor 331 may be a bipolar transistor, PN junctions of which change their behavior with changing temperature. In other embodiments any other conventional implementation of a temperature sensor may be used. The temperature sensor 331, 332 is implemented in a spatial vicinity of the power switch 130; in particular, the temperature sensor 331, 332 is implemented on the same die as the power switch 130. The temperature sensor 331, 332 can sense an ambient temperature of the power switch 130.

Furthermore, the power switch device of FIG. 3 comprises a current limiter 333. Current limiter or over current shut down circuit 333 receives a measure of a current flowing via the load terminals of power MOSFET 130 by measuring a voltage drop across a sense resistor 334 and may control or shut down the gate terminal of power MOSFET 130 to prevent an overcurrent. Other circuitry may also be provided, for example shunt resistors for current limitation. Furthermore, a Zener diode clamp 335 is provided as an overvoltage protection. The shown power switch device 100 serves only illustrative purposes, and in other power switch devices, for example only some of the features or elements shown and/or alternative features or elements may be provided.

Figure 4:
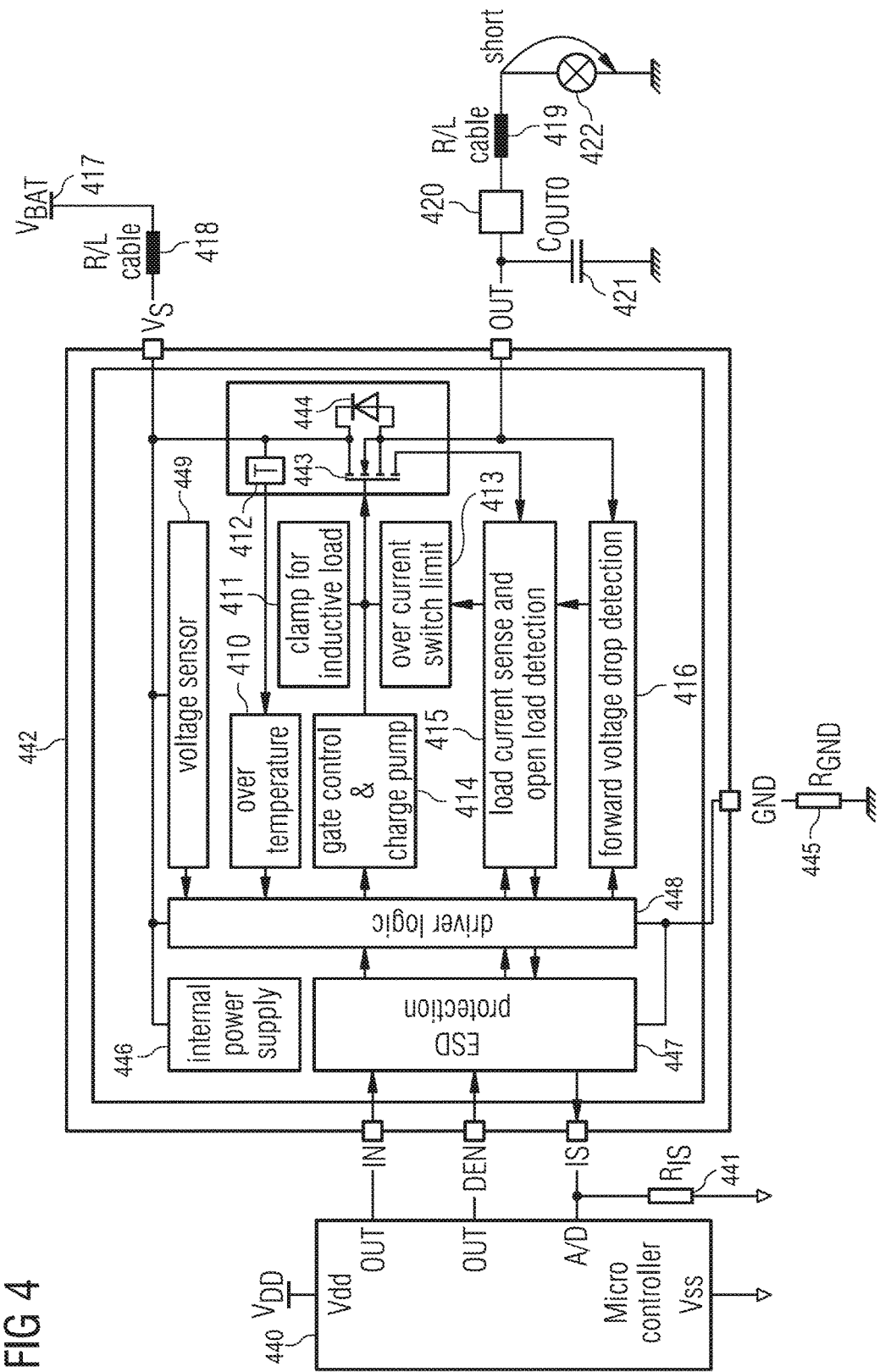
FIG. 4 is a diagram illustrating a device comprising a power switch which may form a basis for some embodiments.

In FIG. 4, a further example of a power switch device 442 serving as a basis for embodiments is shown together with associated circuitry. In the example of FIG. 4, the power switch device 442 comprises a power MOSFET 443 as a power switch, which in the example of FIG. 4 serves to couple a supply voltage, for example a battery voltage, 417 with a load 422. In the example of FIG. 4, the load 422 is represented by a light bulb symbol, although other loads may be used as well.

An impedance, in particular resistance and/or inductivity, of a wiring from supply voltage 417 to a supply voltage input of power switch device 442 is labeled 418 in FIG. 4, and an impedance, for example resistance and/or inductivity, of a wiring from an output pad 420 of power switch device 442 to load 422 is labeled 419 in FIG. 4. All elements of power switch device 442 in some embodiments may be implemented on a single chip or die, although other embodiments may use more than one die. Additionally, an output capacitance 421 may be provided, and power switch device 442 may be coupled to ground via a resistor 445 in some embodiments.

Power switch device 442 may be controlled by a microcontroller 440, which may be coupled with power switch device 442 as shown, including a resistor 441 in the coupling. However, this merely serves as an example.

Signals from microcontroller 440 are provided to a driver logic 448 of power switch device 442 via an ESD protection circuitry 447. Driver logic 448 controls a gate control and charge pump 414, which in turn controls a gate terminal of power MOSFET 443.

Furthermore, power switch device 442 in the embodiment shown comprises a temperature sensor 412, for example as shown in FIG. 3, to detect an overtemperature at overtemperature detection 410. Overtemperature detection 410 is coupled to driver logic 441 and may for example control driver logic 448 to open power MOSFET 443 in case of an overtemperature being detected.

Furthermore, the power switch 442 of the example of FIG. 4 comprises a load current sense and open load detection circuit 415, which may sense a load current. Depending on the load current, driver logic 448 may be controlled to open or close the switch. Furthermore, an overcurrent switch limit 413 may be set upon reaching of which switch 443 may for example be opened. This function may for example correspond to current limiter 333 of FIG. 4.

Furthermore, the power switch device of FIG. 4 may comprise a voltage sensor 449 for monitoring supply voltage 417 and controlling driver logic 448 in response thereto, and a forward voltage drop detection 416 to detect a voltage drop across power switch 443 and again to control driver logic 448 in response thereto.

Furthermore, transistor 443 may have a reverse bias diode 444, either in form of a parasitic diode or in form of a deliberately implemented diode, coupled in parallel to its source and drain terminal, which may form a dissipation path in case of shutdowns. For example, in case of a short circuit of load 422 (as illustrated by an arrow in FIG. 4), a high current may be sensed and overcurrent switch limit 413 may control power switch 443 to open, also referred to as emergency shutdown. In this case, energy stored in inductivities 418, 419 may discharge via diode 444. This in some cases may lead to a comparatively high temperature of power switch 443.

Such short circuits may not only appear due to faulty wiring, faulty loads or other faults, but may also be inherent to certain applications. For example, in case a load like load 337 of FIG. 3 or load 422 of FIG. 4 is a light bulb as illustrated, when first switching on the light bulb, i.e. closing an associated power switch, a filament of the light bulb is still cold. A cold filament of a light bulb typically has a very low resistance, similar to a short circuit. In such a case, power switch 443 may be controlled for example by microcontroller 440 to repetitively retry switching on the light bulb following an emergency shutdown due to overcurrent. In some cases, with each repetition a filament of the light bulb may be heated more, increasing its resistance, until a stable operation is obtained. In some cases, a number of repetitions or retries necessary until a stable state for such a light bulb is reached may depend on a voltage. For example, in automotive applications a supply voltage may not be very stable, leading to variations.

Figure 5:
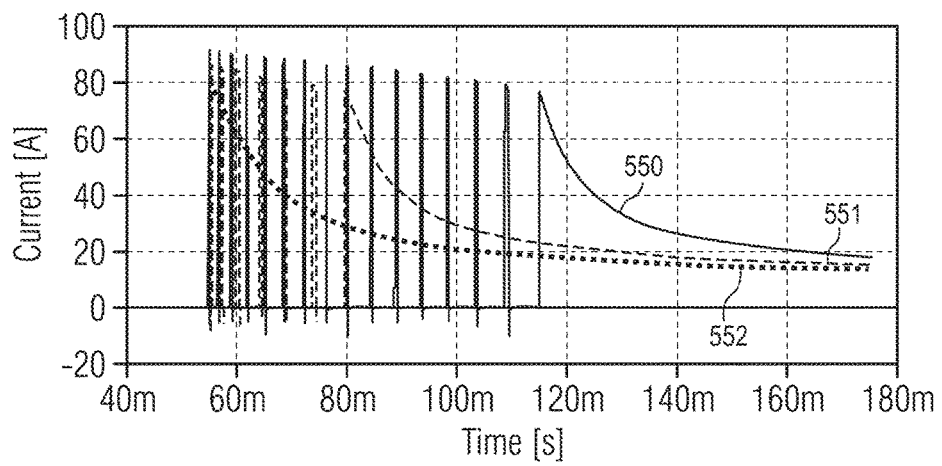
FIG. 5 is a diagram illustrating a time-dependency of a behavior of some devices comprising power switches.

Such a behavior is illustrated in FIG. 5. FIG. 5 shows examples for switching on a cold light bulb via a power switch for three different supply voltages. In FIG. 5, the current is plotted versus time. A curve 552 (dotted line in FIG. 5) shows the behavior for a relatively low voltage, in which case in an example no emergency shutdown is performed, as a current is below a shutdown limit. A curve 551 (dashed line) shows the behavior for a somewhat higher voltage, where the current, e.g., due to the higher voltage, exceeds a shutdown limit, which in the present case may be about 80 A, leading to an emergency shutdown. In the example shown, seven repetitions of switching on are needed until a steady operation is reached. Curve 550 (fall line) shows the behavior for an even higher voltage, where even more repetitions are needed. As can be seen for curves 551 and 550, the current for each repetition slowly decreases compared to the previous try, which is for example due to a filament of a light bulb gradually warming up and thus increasing its resistance, which in turn leads to a lower current.

Figure 6:
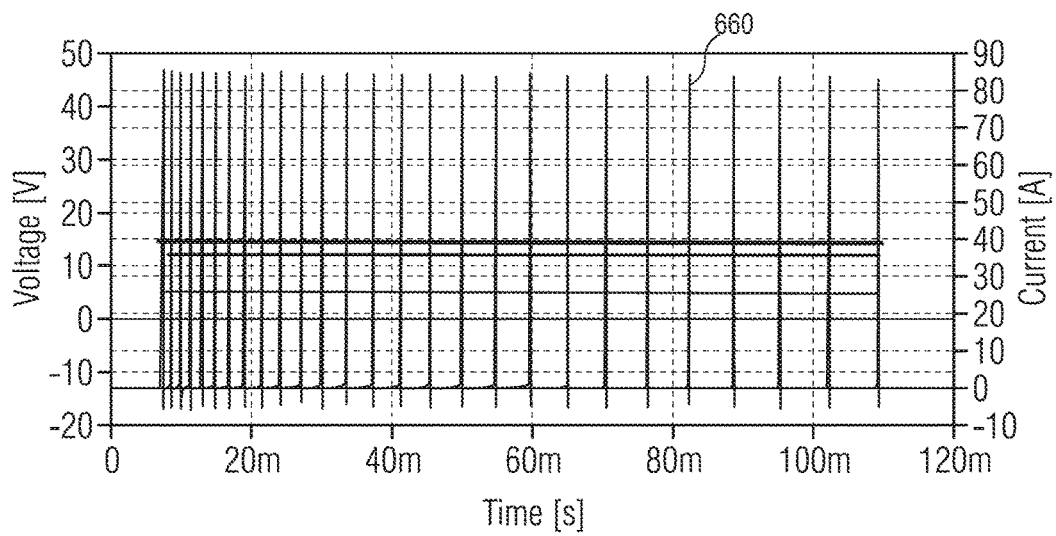
FIG. 6 is a diagram illustrating a time-dependency of a behavior of some devices comprising power switches.

In FIG. 6, a curve 660 shows an example behavior in case of a real short circuit. In such a case, many repetitions may be performed, unless a power switch device used has a repetition limit (for example 8 repetitions, 10 repetitions etc.) built in, after which for example a controlling microcontroller like microcontroller 440 of FIG. 4 will stop any further retries and leaves the power switch device permanently open, for example until a reset is applied externally after repair of a short circuited connection.

A fault condition may be detected by various different measures. For example, a temperature of a power switch may be monitored, for example using temperature sensor 331, 332 of FIG. 3 or temperature sensor 412 of FIG. 4.

When a temperature limit or threshold, for example of the order between 150° C. and 200° C., is exceeded, the power switch may be opened (overtemperature fault condition). In other embodiments, a temperature rise corresponding to a time-gradient and/or a spatial-gradient may be taken as a criteria, for example a temperature rise exceeding a certain threshold. For example, such a threshold may be between 60 and 100 K, for example about 80 K (delta temperature fault condition). Here, a difference of temperatures sensed on the die of the power switch and the PCB can be detected by using two separate temperature sensors. Additionally or alternatively, a current limit or threshold may be monitored, for example between 60 and 100 A, for example about 80 A (overcurrent fault condition). The source-drain current of a MOSFET implementing the power switch can be monitored; alternatively or additionally, the load current to a load connected to the power switch can be monitored. Additionally or alternatively, a voltage drop across a power switch—for example a drain-source voltage if a field effect transistor is used as a switch—may be taken. In some examples, the voltage may only be monitored after a transition phase after turning on and/or after a blanking time. Depending on a technology used, a voltage threshold may for example be of the order of 2 Volts.

Each individual fault condition as outlined above can lead to operation of the power switch, e.g., in an open position. Thus, it is possible to monitor all of the above-identified fault conditions.

Figure 7:
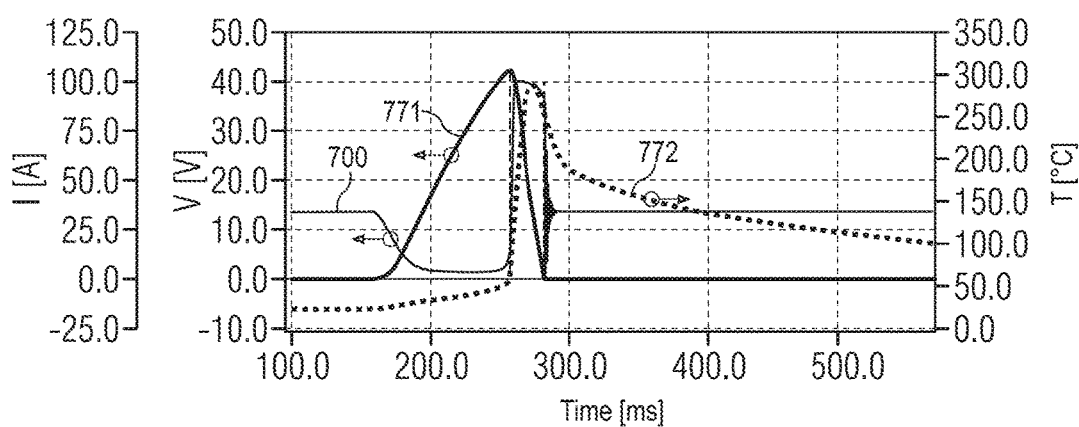
FIGS. 7 and 8 are diagrams illustrating the behavior of some devices comprising power switches during short circuit.

FIG. 7 illustrates aspects of the behavior of various parameters during a fault condition, which leads to an emergency shutdown due to overload, i.e., opening of a power switch. FIG. 7 also illustrates a discharge of energy stored for example in inductivities. FIG. 7 illustrates the behaviors of current, temperature, and voltage during such an event after triggering the fault condition.

A curve 771 (fall line in FIG. 7) illustrates a load current. At a current of a little bit of over 100 A, an opening of the power switch is initiated. A curve 700 (thin full line) illustrates a drain-source voltage over a power switch during the event. Finally, a curve 772 (dotted line) illustrates the temperature of the power switch. As can be seen, due to a discharge (e.g. from inductivities) clamping following the opening of the power switch, the temperature rises significantly. The temperature scale is illustrated on the right of FIG. 7 in degree Celsius, by applying a voltage equivalent.

Figure 8:
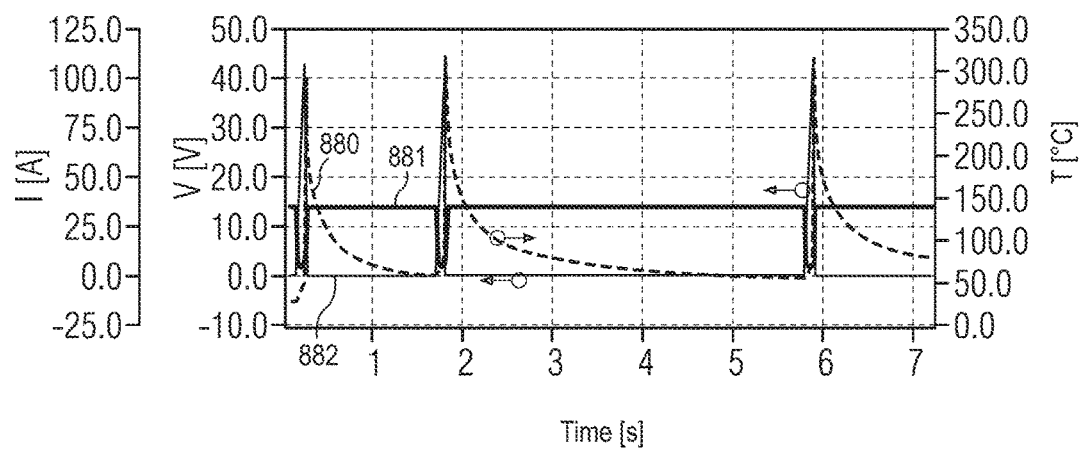

FIG. 8 shows a similar graph as FIG. 7 for three repetitive events. A curve 881 illustrates a drain-source voltage, a curve 880 illustrates a temperature and a curve 882 illustrates a load current. As mentioned, a number of repetitions in some embodiments may be predetermined or may be user-configurable, for example zero (no repetitions), an integer number of repetitions or infinity (i.e. an infinitive number of retries).

As already mentioned, such retries, i.e. repetitions, with the associated temperature rise, may for example shorten the lifetime of a power switch used or lead to failure of the power switch.

FIG. 9 illustrates aspects with respect to a reference implementation of a signal 904 which is non-selectively indicative of any one of the fault conditions having been triggered. Curve 901 illustrates the voltage applied at the terminal labeled IN in FIG. 4. Curve 902 illustrates the presence of a fault condition. Marked by the arrow in FIG. 9 is the point in time when the fault condition is triggered (corresponding to the step in curve 902).

In the example of FIG. 9, the fault condition corresponds to the current through the power switch exceeding an associated threshold 950. This is illustrated by the curve 903 which corresponds to the current output to the load; this is the current provided at the terminal labeled OUT in FIG. 4. Curve 903 exceeds the threshold 950 three times due to repetitive retries of closing the power switch.

Curve 904 denotes the current of the signal provided at the terminal labeled IS in FIG. 4. This pin is sometimes referred to as current sense. The resistor 441 of FIG. 4 converts this current into a voltage which can be sampled, e.g., by an analog-digital converter of the microcontroller 440. The signal 904 corresponds to a ratio sometimes referred to kILIS, or proportionality factor k of IL (curve 903) to IS. E.g., the signal 903 may be generated by using a current mirror mirroring the load current 903. The amplitude of the signal 904 during the fault condition is significantly higher than during the non-fault condition. However, the amplitude of the signal 904 does not reflect different types of fault conditions. In other words, the amplitude of the signal 904 does not change significantly if different fault conditions—such as overtemperature, over-current, etc—are triggered.

Such a non-selective behavior of the signal 904 has certain disadvantages. E.g., it is not easily possible to resolve which particular fault condition was triggered. Thus, in production tests, no direct feedback is available to check if all protection mechanisms associated with the various fault conditions are functional. This requires more complicated testing. Testing may be time-consuming. E.g., production tests of overtemperature and delta temperature fault conditions is sometimes indirectly implemented by so-called cold test and hot test. At a cold test, typically, an ambient temperature of around minus 40° Celsius is applied to check that the corresponding protection mechanisms are operative. Then, the initial protection mechanism which triggers an associated fault condition corresponds to delta temperature. By means of the time delay between applying the cold ambient temperature and the rise of the signal 904 to the fault condition, the delta temperature event can be indirectly monitored. On the other hand, the initial protection mechanism which triggers an associate fault condition during hot test is typically overtemperature; here, via the time until the signal 904 indicates the fault condition, the overtemperature event can be in directly monitor. As can be seen, in order to test overtemperature and delta temperature fault conditions, two tests are required which is time-consuming and expensive. E.g., ambient temperature is required to be changed independently of the current through the power switch.

FIG. 10A illustrates aspects with respect to the time-dependency of the signal 150. FIG. 10A generally corresponds to FIG. 9, however, the signal 150 output at terminal IS is implemented according to techniques described herein. In particular, FIG. 10A illustrates aspects with respect to the signal 150 being selectively indicative of the triggered fault condition. In the example of FIG. 10A, three different fault conditions 1011-1013 are triggered serially. First, and overcurrent fault condition 1011 is triggered; later, a delta temperature fault condition 1012 is triggered lastly, and overtemperature fault condition 1013 is triggered. Again, arrows mark the point in time when the respective fault condition 1011-1013 is triggered. Before the respective next fault condition 1011-1013 is triggered, the previous fault condition 1011-1013 is resolved. In other examples, the fault conditions 1011-1013 may be persistent at least partly over-lapping in time.

As illustrated in FIG. 10A, the signal 150—in accordance with the triggered fault-conditions 1011-1013—assumes different values 1051-1052, 1055. The amplitude of the current associated with the signal 150 corresponding to the value 1051 is indicative of the fault condition 1011; the amplitude of the current associated with the signal 150 corresponding to the value 1052 is indicative of the fault condition 1012; the amplitude of the current associated with the signal 150 corresponding to the value 1053 is indicative of the fault condition 1013. If the fault condition 1011 is triggered (as indicated by the arrow in FIG. 10A), the signal 150 assumes the value 1051. The signal 150 is output having this value 1051 while and as long as the fault condition 1011 is persistent. Once the fault condition 1011 resolves, the signal 150 again assumes the initial value 1055.

Thus, as can be seen from FIG. 10A, it is possible to select the value of the signal 150 from a plurality of candidate values 1051-1053 based on the triggered at least one fault condition 1011-1013. Each one of the plurality of candidate values 1051-1053 is uniquely associated with one of the plurality of fault conditions 1011-1013.

The value 1055 is different from the plurality of candidate values 1051-1053 and is uniquely associated with the non-fault condition 1018 of the device. Prior to the triggering of each one of the fault conditions 1011-1013 and after the respective fault condition 1011-1013 has resolved, the signal 150 assumes the value 1055 associated with the non-fault condition 1018.

FIG. 10B illustrates aspects with respect to the different values 1051-1053 of the signal 150 associated with the different fault conditions 1011-1013. In particular, FIG. 10B illustrates aspects with respect to the different amplitude ranges of the current flow associated with the signal 150. As can be seen from FIG. 10B, different values 1051-1053 which are selectively indicative of the triggered at least one fault condition 1011-1013 are associated with different amplitude ranges of the current flow. The amplitude ranges are all sub-ranges of an overall range (in the example of FIG. 10B 4.4 mA-10 mA) which generally specifies the presence of any fault condition. Each one of the plurality of fault conditions 1011-1013 is thus uniquely associated with the respective amplitude range of the current flow of the at least one signal 150. The values 1051-1053 which are associated with the plurality of fault conditions 1011-1013 are, in turn, all larger than the non-zero minimum value 1050 of the current flow which is associated with the non-fault condition 1018 of the power switch.

While in the example of FIG. 10B each value 1051-1053 is selectively indicative of a single fault condition 1000-1013, in other implementations it would also be conceivable to define additional values which are indicative of a combination of two or more fault conditions 1011-1013 that are simultaneously present. E.g., an additional value could be defined which is indicative of a combined overcurrent fault condition 1011 and delta temperature fault condition 1012; likewise, an additional value could be defined which is indicative of a combined overcurrent fault condition 1011 and overtemperature fault condition 1013; etc. Thus, if a sufficient number of different values for the signal 150 are defined, it is possible that the signal 150 is selectively indicative of each one of the triggered fault conditions 1011-1013.

Because in the scenario of FIG. 10B values of the signal 150 which are indicative of two or more fault conditions 1011-1013 triggered in a combined manner are not available, a priority 1099 is associated with each one of the fault conditions 1011-1013. In the example of FIG. 10B, the fault condition 1011 being a current through the power switch exceeding an associated threshold has an associated first priority 1099; while the fault condition 1012 being a spatial-gradient of the temperature exceeding an associated threshold has an associated second priority 1099; while the fault condition 1013 being an ambient temperature of the power switch exceeding an associated threshold has a third priority 1099. The first priority 1099 of the overcurrent fault condition 1011 is larger than the second priority 1099 of the data temperature fault condition 1012; while the second priority 1099 of the delta temperature fault condition 1012 is higher than the third priority 1099 of the overtemperature fault condition 1013. In an example where the overcurrent fault condition 1011 and the overtemperature fault condition 1013 are concurrently triggered/present at the same moment in time, the signal 150 has the value 1051; thereby, the signal 150 is indicative only of the fault condition 1011, and not indicative of the fault condition 1013. This is because the fault condition 1011 has the higher priority 1099 if compared to the fault condition 1013. As a result, the signal 150 is indicative of a given one of the triggered at least one fault condition 1011-1013; and is not indicative of the remaining one or more of the triggered at least one fault condition 1011-1013.

FIGS. 11A and 11B correspond to FIGS. 10A and 10B, respectively. However, in the scenario of FIGS. 11A and 11B, a further value 1056 of the signal 150 is defined. The value 1056 is different from the plurality of candidate values 1051-1053 uniquely associated with the various fault conditions 1011-1013. The value 1056 is also different from the value 1050 indicative of the non-fault condition. The value 1056 is indicative of a latched fault condition 1019 in response to the previously triggered fault condition 1011-1013 having resolved. Thus, e.g., until a reset event is performed, the latched fault condition 1019 can be persistent. During the latched fault condition 1019 the power switch may be functional and operable, i.e., may be operated in the open position or the closed position.

While with respect to the previous figures examples have been discussed where the signal 150 comprises a current flow which may assume different amplitudes of the corresponding current encoding the different fault conditions, in further examples, it is possible that corresponding techniques are employed for the signal 150 comprising a digital word, wherein the number of the digital word is indicative of the triggered at least one fault condition. Alternatively or additionally, it is also possible that the signal 150 comprises a voltage, wherein an amplitude of the voltage is indicative of the triggered at least one fault condition. As such, the examples discussed above are not limited to implementations where the signal 150 is implemented by a current.

Figure 12:
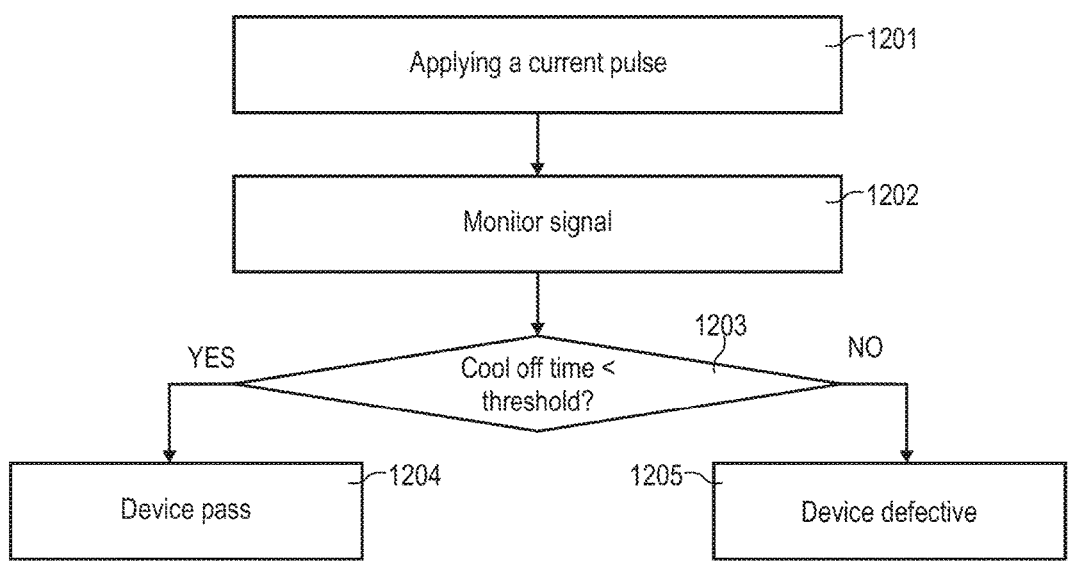
FIG. 12 is a flowchart of a method according to various embodiments.

FIG. 12 is a flowchart of a method according to various embodiments. At block 1201, a dissipation loss is generated, e.g., by applying a current pulse to a power switch of a device under test. E.g., the current pulse can be applied to a power switch as discussed with respect to the previous figures. The current pulse may be a test current pulse which has a well-defined amplitude.

At block 1202, the signal 150 is monitored, e.g., a time-variation of the signal 150 may be repeatedly sampled and checked. The value of the signal 150 is indicative of a spatial-gradient of an ambient temperature of the power switch to which the test current pulse is applied. In detail, the value of the signal 150 may be indicative of the spatial-gradient of the ambient temperature exceeding an associated threshold.

E.g., the value of the signal 150 may indicate that in response to applying the test current pulse at block 1201 the spatial-gradient of the ambient temperature exceeds the associated threshold. This may be due to heating by power dissipated in the power switch when applying the test current pulse. Due to thermal coupling of the power switch, this locally generated heat may, over the course of time, dissipate away from the power switch. Thus, while initially the spatial-gradient of the ambient temperature may be comparably high—thus exceeding the associated threshold—after the corresponding cool-off time the spatial-gradient of the ambient temperature may drop below the threshold. In particular, it is possible to accurately resolve and determine the cool-off time of the power switch based on the signal which has a value selectively indicative of the corresponding fault condition.

At block of 1203, the cool-off time is compared to the threshold. If the cool-off time is below the threshold, at block 1204 the device under test is marked as pass, i.e., non-faulty. If the cool-off time is above the threshold, at block 1205 the device under test is marked as defective, i.e., as faulty. Thus, in blocks 1204 and 1205 the device under test is classified as pass or defective based on the cool-off time.

The cool-off time may be a measure for the quality of the thermal coupling of the power switch/the die on which the power switch is integrated and a chip carrier such as a PCB. If this thermal coupling is defective, the cool-off time can be increased which may be tested according to the method of FIG. 12. Thus, based on the cool-off time it is possible to determine the thermal coupling between the circuit board of the device and the die of the device on which the power switch is integrated.

By using the signal 150 which is selectively indicative of the spatial-gradient of the ambient temperature of the power switch exceeding an associated threshold, it is possible to resolve the delta temperature fault condition of the power switch if compared to further fault conditions which may or may not be triggered due to the applying of the current pulse.

Summarizing, above techniques have been disclosed which enable to indicate the internal fault condition of a device comprising a power switch via a diagnosis output pin to the outside. Different fault conditions such as overcurrent, delta temperature, and overtemperature can thus be distinguished from the outside. While in some examples, the different fault conditions are distinguished by a signal having different current values, in other examples, alternatively or additionally, the corresponding signal could also have different voltage values. It is also possible to employ digital signal.

By such techniques, it is possible that a user can check and distinguish between the different fault conditions. This enables higher safety for the application, e.g., in a scenario where a corresponding monitoring of the fault conditions is done in the field when the device is employed. E.g., during startup of a corresponding device, it is possible to monitor the fault condition. It is also possible to achieve a reduction in cost by reducing the number of delivered defective devices; by implementing a factory-based verification check based on such a signal, defective devices may be avoided to be distributed to customers. Furthermore, corresponding tests can be implemented for all different kinds of fault conditions and associated protection features. In particular, such tests may be implemented at different temperatures. Thereby, the test coverage can be enhanced. Failure in time (FIT) rates can be reduced. The FIT rates can be indicative of a likelihood of malfunctioning per time.

Furthermore, by such techniques, related fault conditions can be clearly discriminated. E.g., and overtemperature fault condition can be clearly distinguished from a delta temperature fault condition. E.g., by applying a test current pulse, it is possible to determine the cool-off time. This enables a so-called Zth evaluation and a check of the quality of thermal coupling, e.g., by soldering etc.

Thus, above techniques have been illustrated which enable to provide a diagnosis pin with information regarding multiple fault conditions. A corresponding signal having a value selectively indicative of the triggered at least one fault condition selected from a plurality of fault conditions can be used in order to improve the reliability of the device operation, e.g., by corresponding checks implemented at the manufacturer or the customer, i.e., by corresponding checks implemented at fabrication or in the field. E.g., a specified window of values associated with a general fault condition can be divided into certain sub-windows which correspond to the different fault conditions such as overcurrent, delta temperature, and overtemperature.

The embodiments described and shown serve only as non-limiting examples, and other embodiments may also be used.

The following examples demonstrate one or more aspects of this disclosure and may be combined in any way.

Example 1

A device, comprising: a solid-state power switch, a control configured to operate the power switch if at least one of a plurality of fault conditions of the device is triggered, and an interface configured to output a signal having a value selectively indicative of the triggered at least one fault condition in response to the at least one fault condition being triggered.

Example 2

The device of example 1, wherein the device is configured to select the value of the signal from a plurality of candidate values based on the triggered at least one fault condition.

Example 3

The device of example 2, wherein each one of the plurality of candidate values is uniquely associated with one of the plurality of fault conditions.

Example 4

The device of examples 2 or 3, wherein a further value different from the plurality of candidate values is uniquely associated with a non-fault condition of the device, wherein the interface is configured to output the signal having the further value indicative of the non-fault condition prior to the at least one fault condition being triggered.

Example 5

The device of any one of examples 2-4, wherein a further value different from the plurality of candidate values is uniquely associated with a latched fault condition of the device, wherein the interface is configured to output the signal having the further value indicative of the latched fault condition in response to the triggered at least one fault condition being resolved.

Example 6

The device of example 5, wherein the interface is configured to output the signal having the further value indicative of the latched fault condition until a reset event is detected.

Example 7

The device of any one of examples 1-6, wherein the plurality of fault conditions are selected from the group consisting of: a current through the power switch exceeding an associated threshold; a time-gradient of the current exceeding an associated threshold; an ambient temperature of the power switch exceeding an associated threshold; a spatial-gradient of the ambient temperature exceeding an associated threshold; and a voltage drop across the power switch exceeding an associated threshold.

Example 8

The device of any one of examples 1-7, wherein the signal comprises a current flow, wherein an amplitude of the current flow is selectively indicative of the triggered at least one fault condition.

Example 9

The device of example 8, wherein each one of the plurality of fault conditions is uniquely associated with a respective amplitude of the current flow of the signal, wherein the amplitudes associated with the plurality of fault conditions are all larger than a non-zero minimum amplitude of the current flow which is associated with at least one of a non-fault condition or a latched fault condition of the power switch.

Example 10

The device of examples 8 or 9, wherein the interface comprises at least one current source configured to generate the current flow of the signal.

Example 11

The device of example 10, wherein the control is configured to operate, by means of a digital control signal, the at least one current source if the at least one of the plurality of fault conditions is triggered.

Example 12

The device of any one of examples 1-11, wherein the signal is selectively indicative of each one of the triggered at least one fault condition.

Example 13

The device of any one of examples 1-12, wherein the signal is selectively indicative of a given one of the triggered at least one fault condition and is not indicative of the remaining one or more of the triggered at least one fault condition.

Example 14

The device of example 13, wherein the device is configured to select the given one of the triggered at least one fault condition depending on a priority associated with each one of the plurality of fault conditions, wherein the fault condition being a current through the power switch exceeding an associated threshold has an associated first priority, wherein the fault condition being a spatial-gradient of the temperature exceeding an associated threshold has an associated second priority, and wherein the fault condition being an ambient temperature of the power switch exceeding an associated threshold has a third priority, wherein the first priority is higher than the second priority, wherein the second priority is higher than the third priority.

Example 15

The device of any one of examples 1-14, wherein the signal comprises at last one of a digital word, a number of the digital word being indicative of the triggered at least one fault condition, and a voltage, an amplitude of the voltage being indicative of the triggered at least one fault condition.

Example 16

The device of any one of examples 1-15, wherein the interface is configured to selectively output the signal having the value indicative of the triggered at least one fault condition while the triggered at least one fault condition is persistent.

Example 17

A method, comprising: operating a solid-state power switch of a device if at least one of a plurality of fault conditions of the device is triggered, in response to the at least one fault condition being triggered: outputting a signal having a value selectively indicative of the triggered at least one fault condition.

Example 18

A method, comprising: applying a current pulse through a solid-state power switch of a device, in response to said applying of the current pulse: monitoring a signal output by the device and having a value selectively indicative of a spatial-gradient of an ambient temperature of the power switch exceeding an associated threshold, based on said monitoring: determining a cool-off time of the power switch.

Example 19

The method of example 18, further comprising: based on the cool-off time: classifying the device as pass or defective.

Example 20

The method of examples 18 or 19, further comprising: based on the cool-off time: determining a thermal coupling between a circuit board of the device and a die of the device on which the power switch is integrated.

What is claimed is:
1. A device comprising:
  a solid-state power switch;
  a control configured to operate the power switch if at least one of a plurality of fault conditions of the device is triggered; and
  an interface configured to output a signal having a value selectively indicative of the triggered at least one fault condition in response to the at least one fault condition being triggered, wherein the signal comprises a current flow, wherein an amplitude of the current flow is selectively indicative of the triggered at least one fault condition.

2. The device of claim 1, wherein the device is configured to select the value of the signal from a plurality of candidate values based on the triggered at least one fault condition.

3. The device of claim 2, wherein each one of the plurality of candidate values is uniquely associated with one of the plurality of fault conditions.

4. The device of claim 2,
wherein a further value different from the plurality of candidate values is uniquely associated with a non-fault condition of the device, and
wherein the interface is configured to output the signal having the further value indicative of the non-fault condition prior to the at least one fault condition being triggered.

5. The device of claim 2,
wherein a further value different from the plurality of candidate values is uniquely associated with a latched fault condition of the device, and
wherein the interface is configured to output the signal having the further value indicative of the latched fault condition in response to the triggered at least one fault condition being resolved.

6. The device of claim 5, wherein the interface is configured to output the signal having the further value indicative of the latched fault condition until a reset event is detected.

7. The device of claim 1, wherein the plurality of fault conditions are one or more of:
a current through the power switch exceeding an associated threshold;
a time-gradient of the current exceeding an associated threshold;
an ambient temperature of the power switch exceeding an associated threshold;
a spatial-gradient of the ambient temperature exceeding an associated threshold; or
a voltage drop across the power switch exceeding an associated threshold.

8. The device of claim 1,
wherein each one of the plurality of fault conditions is uniquely associated with a respective amplitude of the current flow of the signal, and
wherein the amplitudes associated with the plurality of fault conditions are all larger than a non-zero minimum amplitude of the current flow which is associated with at least one of a non-fault condition or a latched fault condition of the power switch.

9. The device of claim 1, wherein the interface comprises at least one current source configured to generate the current flow of the signal.

10. The device of claim 9, wherein the control is configured to operate, by means of a digital control signal, the at least one current source if the at least one of the plurality of fault conditions is triggered.

11. The device of claim 1, wherein the signal is selectively indicative of each one of the triggered at least one fault condition.

12. The device of claim 1, wherein the signal is selectively indicative of a given one of the triggered at least one fault condition and is not indicative of the remaining one or more of the triggered at least one fault condition.

13. The device of claim 12,
wherein the device is configured to select the given one of the triggered at least one fault condition depending on a priority associated with each one of the plurality of fault conditions,
wherein the fault condition being a current through the power switch exceeding an associated threshold has an associated first priority,
wherein the fault condition being a spatial-gradient of the temperature exceeding an associated threshold has an associated second priority,
wherein the fault condition being an ambient temperature of the power switch exceeding an associated threshold has a third priority,
wherein the first priority is higher than the second priority, and
wherein the second priority is higher than the third priority.

14. The device of claim 1, wherein the signal comprises at last one of a digital word, a number of the digital word being indicative of the triggered at least one fault condition, and a voltage, an amplitude of the voltage being indicative of the triggered at least one fault condition.

15. The device of claim 1, wherein the interface is configured to selectively output the signal having the value indicative of the triggered at least one fault condition while the triggered at least one fault condition is persistent.

16. A method comprising:
operating a solid-state power switch of a device if at least one of a plurality of fault conditions of the device is triggered, and
in response to the at least one fault condition being triggered, outputting a signal having a value selectively indicative of the triggered at least one fault condition, wherein the signal comprises a current flow, wherein an amplitude of the current flow is selectively indicative of the triggered at least one fault condition.

17. A device comprising:
a solid-state power switch;
a control configured to operate the power switch if at least one of a plurality of fault conditions of the device is triggered, wherein a further value different from the plurality of candidate values is uniquely associated with a latched fault condition of the device; and
an interface configured to:
output a signal having a value selectively indicative of the triggered at least one fault condition in response to the at least one fault condition being triggered; and
output the signal having the further value indicative of the latched fault condition in response to the triggered at least one fault condition being resolved,
wherein the device is configured to select the value of the signal from a plurality of candidate values based on the triggered at least one fault condition.

18. The device of claim 17, wherein the interface is configured to selectively output the signal having the value indicative of the triggered at least one fault condition while the triggered at least one fault condition is persistent.

19. A device comprising:
a solid-state power switch;
a control configured to operate the power switch if at least one of a plurality of fault conditions of the device is triggered; and
an interface configured to output a signal having a value selectively indicative of the triggered at least one fault condition in response to the at least one fault condition being triggered,
wherein the signal is selectively indicative of a given one of the triggered at least one fault condition and is not indicative of the remaining one or more of the triggered at least one fault condition, wherein the device is configured to select the given one of the triggered at least one fault condition depending on a priority associated with each one of the plurality of fault conditions, wherein the fault condition being a current through the power switch exceeding an associated threshold has an associated first priority, wherein the fault condition being a spatial-gradient of the temperature exceeding an associated threshold has an associated second priority, wherein the fault condition being an ambient temperature of the power switch exceeding an associated threshold has a third priority, wherein the first priority is higher than the second priority, and wherein the second priority is higher than the third priority.

20. A device comprising:

a solid-state power switch;

a control configured to operate the power switch if at least one of a plurality of fault conditions of the device is triggered; and an interface configured to:
  output a signal having a value selectively indicative of the triggered at least one fault condition in response to the at least one fault condition being triggered; and
  selectively output the signal having the value indicative of the triggered at least one fault condition while the triggered at least one fault condition is persistent.

* * * * *